US012759527B2

(12) United States Patent
Brok et al.

(10) Patent No.: US 12,759,527 B2
(45) Date of Patent: Oct. 13, 2026

(54) METHOD FOR OPERATING A BRAKING SYSTEM FOR A MOTOR VEHICLE, CORRESPONDING BRAKING SYSTEM FOR A MOTOR VEHICLE AND COMPUTER PROGRAM PRODUCT

(71) Applicant: AUDI AG, Ingolstadt (DE)

(72) Inventors: Tobias Brok, Kösching (DE); Thomas Hanisch, Dollnstein (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 18/739,715

(22) Filed: Jun. 11, 2024

(65) Prior Publication Data

US 2025/0018918 A1 Jan. 16, 2025

(30) Foreign Application Priority Data

Jul. 11, 2023 (DE) ........................ 102023118244.7

(51) Int. Cl.

*B60T 17/22* (2006.01)
*B60T 8/171* (2006.01)
*B60T 8/32* (2006.01)
*F16D 65/12* (2006.01)

(52) U.S. Cl.

CPC ............. *B60T 17/22* (2013.01); *B60T 8/171* (2013.01); *B60T 8/3255* (2013.01); *F16D 65/127* (2013.01); *B60T 2220/04* (2013.01); *B60T 2250/02* (2013.01); *F16D 2250/0046* (2013.01)

(58) Field of Classification Search

None

See application file for complete search history.

(56) References Cited

U.S. PATENT DOCUMENTS

| | | | | |
|---|---|---|---|---|
| 4,239,666 A * | 12/1980 | Jacko | .................... | F16D 69/021 524/72 |
| 2002/0046909 A1* | 4/2002 | Sokoll | .................... | F16D 66/026 188/1.11 W |
| 2015/0082850 A1 | 3/2015 | Flores et al. | | |
| 2019/0072145 A1* | 3/2019 | Chung | .................. | F16D 65/127 |

(Continued)

FOREIGN PATENT DOCUMENTS

| | | | | |
|---|---|---|---|---|
| CN | 113147712 A * | 7/2021 | .............. | B60T 13/74 |
| DE | 10325623 A1 * | 12/2004 | ............ | B60T 17/221 |

(Continued)

OTHER PUBLICATIONS

D.-Meng, L.-Zhang, and Z.-Yu, "Modeling and simulation of brake judder considering the effects of thermo-mechanical coupling," Journal of Vibroengineering, vol. 16, No. 7, pp. 3637-3654, Nov. 2014. (Year: 2014).*

(Continued)

*Primary Examiner* — Jennifer M Anda

(74) *Attorney, Agent, or Firm* — Maier & Maier, PLLC

(57) ABSTRACT

A method for operating a braking system for a motor vehicle, which has a service brake device with at least one wheel brake and a brake pressure applied to the wheel brake for generating a braking force acting on a brake disc of the wheel brake is adjusted at least temporarily depending on a setting of an operating element. A condition of a coating of a brake disc of the wheel brake is determined based on the brake pressure applied to the wheel brake and a deceleration of the motor vehicle resulting therefrom.

19 Claims, 1 Drawing Sheet

(56) References Cited

U.S. PATENT DOCUMENTS

| | | | | |
|---|---|---|---|---|
| 2020/0039479 | A1* | 2/2020 | Volkmar | B60T 1/065 |
| 2021/0285507 | A1* | 9/2021 | Ebisumoto | F16D 48/02 |
| 2022/0316543 | A1* | 10/2022 | Suzuki | C08K 3/16 |
| 2023/0256544 | A1* | 8/2023 | Najafi | B23K 26/60 219/121.85 |

FOREIGN PATENT DOCUMENTS

| | | | | |
|---|---|---|---|---|
| DE | 102009011986 | A1 | 9/2010 | |
| DE | 102011113093 | A1 | 3/2013 | |
| DE | 102014119024 | A1 | 8/2015 | |
| DE | 102017002148 | A1 | 9/2017 | |
| DE | 102004030641 | B4 * | 3/2022 | B60T 13/586 |
| DE | 102017002148 | B4 | 6/2023 | |
| EP | 3186122 | B1 | 7/2021 | |
| WO | WO-2016030699 | A1 * | 3/2016 | B60T 8/17 |
| WO | WO-2019101712 | A1 * | 5/2019 | B60T 13/365 |

OTHER PUBLICATIONS

Machine translation of DE-10325623-A1 (Year: 2025).*
Machine translation of CN-113147712-A (Year: 2025).*
Machine translation of DE-102004030641-B4 (Year: 2026).*
Machine translation of WO-2019101712-A1 (Year: 2026).*
Extended Search Report issued on Oct. 22, 2024, in corresponding European Application No. 24176934.8, 18 pages.
Search Report issued on May 27, 2024 in corresponding German Application No. 10 2023 118 244.7; 12 pages.

* cited by examiner

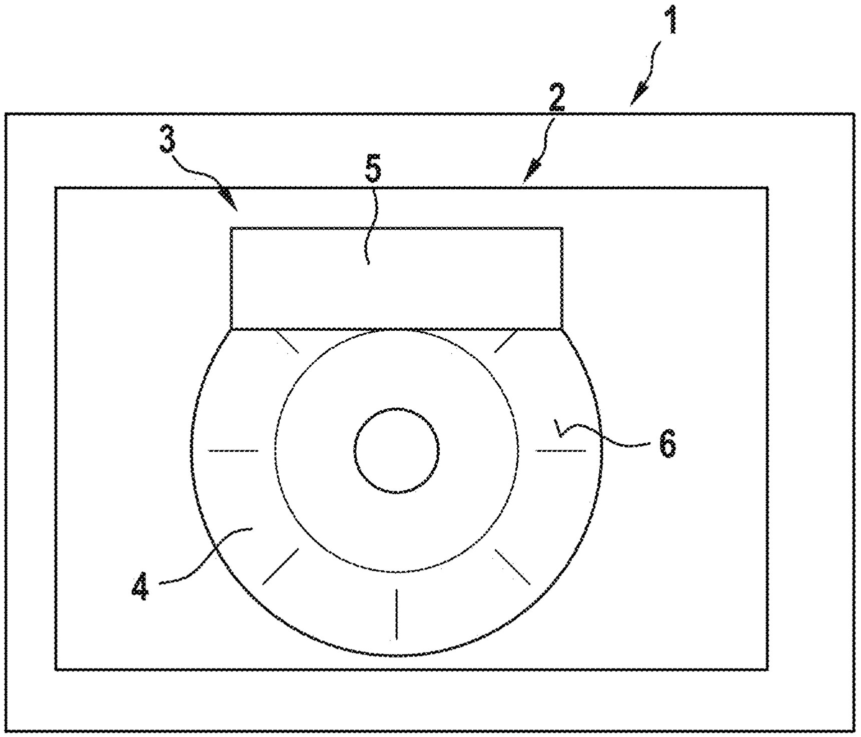
1
2
3
5
6
4

METHOD FOR OPERATING A BRAKING SYSTEM FOR A MOTOR VEHICLE, CORRESPONDING BRAKING SYSTEM FOR A MOTOR VEHICLE AND COMPUTER PROGRAM PRODUCT

FIELD

The invention relates to a method for operating a braking system for a motor vehicle, which has a service brake device with at least one wheel brake and a brake pressure applied to the wheel brake for generating a braking force acting on a brake disc of the wheel brake is adjusted at least temporarily depending on a setting of an operating element. The invention further relates to a braking system for a motor vehicle and a computer program product.

BACKGROUND

For example, document EP 3 186 122 B1 is known from the prior art. This describes a method of monitoring the braking performance of a vehicle, wherein the method includes: providing a brake monitoring system having at least one microprocessor on the vehicle for at least some braking events, wherein the brake monitoring system determines a braking demand and a vehicle deceleration; differentiating between qualifying braking events and non-qualifying braking events, including determining that a braking event is a non-qualifying event, at least in part in response to determining that an output pressure is applied for a period of time less than or equal to a threshold value; defining a data set of qualifying braking events, wherein each braking event in the data set includes a particular braking demand and a particular vehicle deceleration; applying a method of statistical trend analysis to the data set to determine a straight line trend of vehicle deceleration and braking demand; providing a reference of the vehicle deceleration and braking demand; and comparing at least one trend value to at least one reference value.

SUMMARY

It is the object of the invention to propose a method for operating a braking system for a motor vehicle which has advantages over known methods, in particular ensures compliance with an emission limit value.

This is achieved according to the invention with a method for operating a braking system for a motor vehicle. It is intended that a condition of a coating of a brake disc of the wheel brake is determined based on the brake pressure applied to the wheel brake and a deceleration of the motor vehicle resulting therefrom.

It is pointed out that the embodiments explained in the description are not restrictive; rather, any variations of the features disclosed in the description, the claims and the FIGURES can be implemented.

The method is used to operate the braking system. This is preferably part of the motor vehicle, but can of course also be separate from it. The braking system serves to brake the motor vehicle, i.e., to decelerate or reduce the speed of the motor vehicle, in particular to a standstill, and/or to immobilize the motor vehicle at a standstill. For the former, the braking system comprises the service brake device, which at least temporarily applies the braking force to at least one wheel of the motor vehicle, preferably to several or all wheels of the motor vehicle. This braking force can also be called service braking force. If there are several wheels, at least one wheel is to be regarded as part of these several wheels. Where this specification refers to the wheel or at least one wheel, the definitions are equivalent. They are also preferably transferable to each of the several wheels.

The at least one wheel is assigned to the wheel axle of the motor vehicle to which the braking force is applied by means of the service brake device or at which the braking force is effected. The wheel axle is, for example, a rear wheel axle or a front wheel axle of the motor vehicle. Preferably, the service brake device is provided and designed to apply the braking force at least temporarily to several wheels of the wheel axle and/or wheels of several wheel axles. Particularly preferably, the service brake device is used to apply the braking force to several or all wheel axles of the motor vehicle or their wheels or to brake the corresponding wheels, at least temporarily.

The service brake device has at least one wheel brake, which is assigned to at least one wheel or at least one wheel axle. Preferably, the service brake device has a plurality of wheel brakes, wherein each of the wheel brakes is assigned to a wheel or a wheel axle of the motor vehicle. Particularly preferably, the wheel brakes are present on several wheels and/or wheel axles, in particular each wheel and/or each wheel axle of the motor vehicle is assigned a separate wheel brake. By means of the wheel brake, the braking force is applied to the wheel axle or the respective wheel of the motor vehicle. The braking force is understood to mean the force exerted on the brake disc of the wheel brake in its circumferential direction with respect to an axis of rotation of the brake disc, in particular by means of a brake caliper. To apply the braking force to the brake disc, the brake caliper presses one or more brake pads onto the brake disc, depending on the brake pressure applied to the wheel brake. The braking force is preferably proportional or at least approximately proportional to the brake pressure.

The braking force provided by the service brake device can usually be adjusted as desired. This depends on the setting of the operating element via which a driver of the motor vehicle specifies the braking force. The operating element is arranged so that it can be reached by the driver from a passenger compartment of the motor vehicle; in particular, it is located at least partially in front of the passenger compartment or protrudes into it. The operating element is particularly preferably designed as a brake pedal, i.e., it is intended and designed to be operated by a foot of the driver or to be foot-operated by the driver.

The braking system evaluates the setting of the operating element, for example its position, and uses the setting to determine the braking force specified by the driver. This can also be referred to as the specified braking force. The service brake device is at least temporarily controlled in such a way that it applies a braking force to the wheel axle of the motor vehicle or to at least one wheel which corresponds to the specified braking force. In particular, a specified braking force corresponding to the target braking force is specified for the service brake device and the service brake device sets an actual braking force acting on the wheel axle or the at least one wheel in such a way that it corresponds to the target braking force and thus to the specified braking force.

The service brake device, for example, is at least temporarily connected purely electronically to the operating element, so that the control of the wheel brake or wheel brakes is carried out purely electronically at least temporarily, depending on the setting of the operating element. However, it can also be provided that there is a mechanical and/or hydraulic fallback level between the operating element and the wheel brake, so that in the event of a failure of the electronic connection, the braking force can still be applied or adjusted using the operating element. Particularly preferably, the operating element is permanently connected purely electronically to the service brake device or, conversely, the service brake device is permanently connected purely electronically to the operating element.

The generation of the braking force depending on the setting of the operating element is carried out by a control unit of the braking system. For this purpose, the control unit evaluates the setting of the operating element, determines the braking force or the specified braking force and controls the service brake device to generate the actual braking force, which corresponds to the specified braking force or the target braking force. For this purpose, the setting of the operating element is transmitted to the control unit, in particular via a data transmission connection.

When using the wheel brake to generate braking force, abrasion occurs, particularly of the brake disc and/or brake pads attached to the brake caliper. This abrasion enters the external environment of the vehicle as dust, which represents emissions from the braking system. It therefore influences the total emissions of the motor vehicle, which consist, for example, of emissions from a motor vehicle's drive system and emissions from the braking system. In order to reduce emissions from the braking system, various measures are being considered. For example, it is possible to extract the abrasion of the brake disc and/or the brake pads, in particular from a wheel arch of the motor vehicle, and to separate it from the extracted air using a filter. However, this is complex and requires additional components that require installation space.

For this reason, according to the invention, the brake disc should be provided with a coating which is designed to reduce emissions. The coating therefore ensures that when the wheel brake is used to brake or decelerate the vehicle, less abrasion occurs than with a brake disc without the coating, for example made of gray cast iron. However, during operation of the braking system, the coating wears down, for example due to the continued reduced level of abrasion and/or damage to the coating. However, a brake disc with a worn coating will result in a greater amount of wear compared to a brake disc with an unworn coating.

This can result in the vehicle having total emissions during operation that are higher than the intended emissions, i.e., exceeding the emission limit value. It is therefore planned to monitor the condition of the coating. For this purpose, the condition of the coating is determined from the brake pressure applied to the wheel brake and the deceleration of the vehicle resulting from the brake pressure. While the braking force acting on the brake disc of the wheel brake is present, the brake pressure used for this purpose and the deceleration of the motor vehicle occurring when the brake pressure is present are recorded. The condition of the coating is then determined from these values; the condition of the coating is therefore a function of the brake pressure and the deceleration.

Based on the condition, it can then be assessed whether there is a defect in the coating or whether the coating is OK. For example, a pressure/deceleration characteristic curve is stored for this purpose, in which the brake pressure required for a certain deceleration is plotted against the deceleration. Due to the coating, the pressure/deceleration characteristic curve will usually be flatter than with a brake disc without the coating. The condition of the coating can be determined based on the brake pressure applied to the wheel brake and the resulting deceleration, for example by using the pressure/deceleration characteristic curve. If the brake pressure corresponds to a brake pressure resulting from the pressure/deceleration characteristic curve for the current deceleration of the vehicle, it is recognized that the coating is OK. However, if it deviates from this, especially by more than a specified tolerance, the coating defect is detected. If this is the case, a defect signal is preferably generated and/or the coating defect is signaled to the driver of the motor vehicle, for example optically, acoustically and/or haptically. In any case, the procedure described can be used to ensure that the braking system or the motor vehicle is operated as intended, in particular in compliance with limit values for the emissions of the braking system and/or the total emissions.

A further development of the invention provides that a brake disc provided with the coating by laser coating is used as the brake disc. The brake disc is made of a brake disc material, for example gray cast iron. The coating is applied to the brake disc, which according to the invention is done by laser coating. The coating consists of a coating material which is preferably different from the brake disc material. The coating material preferably has a higher hardness than the brake disc material. For example, a hard material is used as a coating material, so that the coating can also be called a hard material coating. For example, tungsten carbide is used as a coating material. Laser coating is done, for example, by laser powder deposition welding. The coating is preferably produced with a coating thickness of not more than 200 μm, not more than 150 μm or not more than 100 μm. By using such a brake disc, the emissions of the braking system are significantly reduced.

A further development of the invention provides that if the deceleration deviates from a deceleration target value stored for the brake pressure, a defect in the coating is detected. This has essentially already been mentioned above. The deceleration target value is stored as a function of the brake pressure, namely in the form of the pressure/deceleration characteristic curve. This relates different brake pressures to the decelerations that occur with them. If the actual deceleration, which can also be referred to as the real deceleration, deviates from the target deceleration value, it can be assumed that the coating has the defect. The deviation of the deceleration from the deceleration target value can be either in the direction of smaller decelerations or in the direction of larger decelerations. In other words, it is only recognized that the coating is OK if the deceleration corresponds to the deceleration target value, in particular taking into account a specified tolerance. Otherwise the coating defect will be detected. This enables a reliable assessment of the condition of the coating.

A further development of the invention provides that a vehicle weight of the motor vehicle is determined and, based on the vehicle weight, a deceleration force acting on the motor vehicle is calculated from the deceleration of the motor vehicle. The deceleration is not used directly to determine the condition of the coating, but is first converted into the deceleration force. The deceleration force is the force which has a braking or decelerating effect on the motor vehicle during the braking force acting on the brake disc. The vehicle weight of the motor vehicle is used to calculate the deceleration force; in particular, the deceleration force results from multiplying the vehicle weight by the deceleration. The vehicle weight is usually determined during operation of the braking system, for example by using known state variables of the motor vehicle, which are provided, for example, via the CAN bus. Determining the deceleration force makes it possible to determine the condition of the coating with high accuracy.

A further development of the invention provides that a friction coefficient of the wheel brake is determined based on the brake pressure and the deceleration force. Both the brake pressure and the deceleration force are known. The brake pressure is used to determine the contact force with which the brake pads are pressed against the brake disc. From this pressing force or brake pressure on the one hand and the deceleration force on the other hand, the friction coefficient present at the wheel brake between the brake disc and the brake pads can be determined. The coefficient of friction can be used to determine the condition of the coating with high accuracy.

A further development of the invention provides that if the friction coefficient deviates from a coefficient target value, the defect in the coating is detected. The friction coefficient is determined in the manner described. The coefficient target value is stored for the brake disc or the coating, in particular in the control unit of the braking system. Preferably, when installing the brake disc, the coefficient target value for a completely intact coating is stored. If the actual friction coefficient deviates from the coefficient target value during operation of the braking system, it is concluded that the coating is defective.

In other words, it is only recognized that the coating is OK if the friction coefficient corresponds to the stored coefficient target value, in particular taking into account a specified tolerance. If, however, the friction coefficient deviates from the coefficient target value, in particular by more than the specified tolerance, the coating defect is detected. This means that unacceptably high emissions from the braking system are reliably detected and can therefore be avoided.

A further development of the invention provides that the deceleration target value and/or the coefficient target value are determined and stored during a running-in operation of the braking system. The running-in operation occurs after the brake disc has been installed in the braking system or the wheel brake or is initiated with this. For example, during installation of the brake disc, the previously stored target value is deleted. The run-in operation is then initiated. This is done until the deceleration for different brake pressures and/or the friction coefficient are reliably determined. If this is the case, they are stored as a deceleration target value or as a coefficient target value and are subsequently used to determine the condition of the coating. This ensures that the braking system is reliably adjusted to the brake disc installed.

A further development of the invention provides that the coating defect is only detected if the deceleration deviates several times from the deceleration target value and/or the friction coefficient deviates from the coefficient target value. The deviation in the deceleration or the friction coefficient is not necessarily caused by the defect in the coating, but can occur, for example, due to environmental conditions of the motor vehicle. In particular, it can happen that foreign substances are present between the brake disc and the brake pads, for example water, salt or the like. For this reason, the coating defect is not immediately detected as soon as the deviation occurs. Rather, it is necessary for the deviation to occur several times, in particular at certain minimum time intervals. Preferably, the coating defect is only detected if the deviation occurs several times and there is at least a certain time interval between individual deviations. This reliably prevents false detection of coating defects.

The invention further relates to a braking system for a motor vehicle, in particular for carrying out the method according to the statements in the context of this specification, wherein the braking system has a service brake device with at least one wheel brake and is provided and designed to adjust a brake pressure applied to the wheel brake for generating a braking force acting on a brake disc of the wheel brake, at least temporarily, depending on a setting of an operating element. The braking system is further provided and designed to determine a condition of a coating of a brake disc of the wheel brake based on the brake pressure applied to the wheel brake and a deceleration of the motor vehicle resulting therefrom.

The advantages of such an embodiment of the braking system and of such a procedure have already been Both the braking system for the motor vehicle and the method for operating it can be further refined according to the embodiments in the scope of this specification, to which reference will therefore be made.

In addition, the invention relates to a computer program product comprising instructions which cause the braking system for the motor vehicle to carry out the method explained in accordance with the embodiments of this specification. Regarding the advantages and possible advantageous further training, please refer to the specification in full.

The features and feature combinations described in the description, in particular the features and feature combinations described below in the description of the FIGURES and/or shown in the FIGURES may be used not only in the respective combination specified, but also in other combinations or alone, without departing from the scope of the invention. The invention should therefore also be considered to comprise embodiments that are explicitly not shown or explained in the description and/or the FIGURES, but emerge from the explained embodiments or can be derived from them.

BRIEF DESCRIPTION OF THE FIGURES

In the following, the invention will be explained in greater detail with reference to the exemplary embodiment depicted in the drawings, without this restricting the invention. In particular, the only FIG. 1 is a schematic representation of a region of a braking system for a motor vehicle.

DETAILED DESCRIPTION

FIG. 1 is a schematic representation of a region of a braking system for a motor vehicle. The braking system 1 has a service brake device 2, which in turn has a wheel brake 3 shown here. The wheel brake 3 is assigned to a wheel of the motor vehicle or a wheel axle of the motor vehicle. It has a brake disc 4 and a brake caliper 5, on which brake pads (not shown here) are arranged on opposite sides of the brake disc 4. To generate a braking force, a brake pressure is applied to the wheel brake 3. As a result, the brake pads are pressed by the brake caliper 5 onto the brake disc 4, so that the braking force is present due to the frictional connection between the brake disc 4 and the brake pads. The brake disc 4 is provided with a coating, in particular made of a hard material, in order to reduce abrasion occurring during the generation of the braking force.

In order to reliably comply with the emission limits specified for the braking system, it is necessary to monitor the condition of the coating 6. For this purpose, the brake pressure applied to the wheel brake 3 and a deceleration of the motor vehicle resulting from the brake pressure are used. In other words, the condition of the coating 6 results as a function of the brake pressure and the deceleration of the motor vehicle, which is achieved by means of the wheel brake 3. For example, a pressure/deceleration characteristic curve stored in a control unit of the braking system 1 is used for this purpose. However, it can also be provided that a currently existing friction coefficient of the wheel brake 3 or between the brake disc 4 and the brake pads is determined and compared with a target value. In any case, the condition of the coating 6 is reliably detected and, in particular, it is determined if there is a defect in the coating 6. In this case, a defect signal is preferably generated and/or the defect is displayed to a driver of the motor vehicle. Thus, the emission limits can be reliably complied with by the braking system 1.

LIST OF REFERENCE NUMERALS

1 Braking system
2 Service brake device
3 Wheel brake
4 Brake disc
5 Brake caliper
6 Coating

The invention claimed is:

1. A method for operating a braking system for a motor vehicle, comprising:
operating the braking system;
applying a brake pressure to a wheel brake to generate a braking force acting on a brake disc of the wheel brake;
at least temporarily adjusting the brake pressure depending on a setting of an operating element; and
determining a condition of a coating of the brake disc of the wheel brake on the basis of the brake pressure applied to the wheel brake and a deceleration of the motor vehicle resulting therefrom by using a pressure/deceleration characteristic curve stored in a control unit of the braking system, wherein the pressure/deceleration characteristic curve relates different brake pressures to decelerations that occur with the coating, and wherein a defect in the coating is detected when the deceleration deviates from a deceleration target value obtained from the pressure/deceleration characteristic curve for the brake pressure.

2. The method according to claim 1, wherein the coating of the brake disc is a laser coating.

3. The method according to claim 2, further comprising determining a vehicle weight of the motor vehicle; and
calculating a deceleration force acting on the motor vehicle based on the vehicle weight and the deceleration of the motor vehicle.

4. The method according to claim 2, further comprising determining a friction coefficient of the wheel brake based on the brake pressure and a deceleration force.

5. The method according to claim 2, further comprising determining the defect in the coating based on a friction coefficient deviating from a coefficient target value.

6. The method according to claim 1, further comprising determining a vehicle weight of the motor vehicle; and
calculating a deceleration force acting on the motor vehicle based on the vehicle weight and the deceleration of the motor vehicle.

7. The method according to claim 6, further comprising determining a friction coefficient of the wheel brake based on the brake pressure and a deceleration force.

8. The method according to claim 6, further comprising determining the defect in the coating based on a friction coefficient deviating from a coefficient target value.

9. The method according to claim 1, further comprising determining a friction coefficient of the wheel brake based on the brake pressure and a deceleration force.

10. The method according to claim 9, further comprising determining the defect in the coating based on the friction coefficient deviating from a coefficient target value.

11. The method according to claim 1, further comprising determining a defect in the coating based on a friction coefficient deviating from a coefficient target value.

12. The method according to claim 1, wherein a deceleration target value and/or a coefficient target value are determined and stored during a running-in operation of the braking system.

13. The method according to claim 1, further comprising detecting a defect in the coating when the deceleration deviates a plurality of times from a deceleration target value and/or a friction coefficient deviates several times from a coefficient target value.

14. The method according to claim 1, further comprising determining a vehicle weight of the motor vehicle; and
calculating a deceleration force acting on the motor vehicle based on the vehicle weight and the deceleration of the motor vehicle.

15. The method according to claim 1, further comprising determining a friction coefficient of the wheel brake based on the brake pressure and a deceleration force.

16. The method according to claim 1, further comprising determining the defect in the coating based on a friction coefficient deviating from a coefficient target value.

17. The method according to claim 1, further comprising:
generating a defect signal and/or signaling the defect to a driver of the motor vehicle when the condition indicates a defect in the coating.

18. A braking system for a motor vehicle, comprising;
a service brake device with at least one wheel brake configured to adjust a brake pressure applied to the at least one wheel brake for generating a braking force acting on a brake disc of the at least one wheel brake at least temporarily depending on a setting of an operating element,
wherein the braking system is further provided and designed to determine a condition of a coating of the brake disc of the at least one wheel brake on the basis of the brake pressure applied to the at least one wheel brake and a deceleration of the motor vehicle resulting therefrom by using a pressure/deceleration characteristic curve stored in a control unit of the braking system, wherein the pressure/deceleration characteristic curve relates different brake pressures to decelerations that occur with the coating, and wherein a defect in the coating is detected when the deceleration deviates from a deceleration target value obtained from the pressure/deceleration characteristic curve for the brake pressure.

19. A computer program product comprising a processor and a non-transitory computer readable medium containing instructions configured to cause the processor to perform the steps of:
operating a braking system;
applying a brake pressure to a wheel brake to generate a braking force acting on a brake disc of the wheel brake;
at least temporarily adjusting the brake pressure depending on a setting of an operating element; and
determining a condition of a coating of the brake disc of the wheel brake on the basis of the brake pressure applied to the wheel brake and a deceleration of the motor vehicle resulting therefrom by using a pressure/ deceleration characteristic curve stored in a control unit of the braking system, wherein the pressure/deceleration characteristic curve relates different brake pressures to decelerations that occur with the coating, and wherein a defect in the coating is detected when the deceleration deviates from a deceleration target value obtained from the pressure/deceleration characteristic curve for the brake pressure.

* * * * *